Patented Feb. 9, 1943

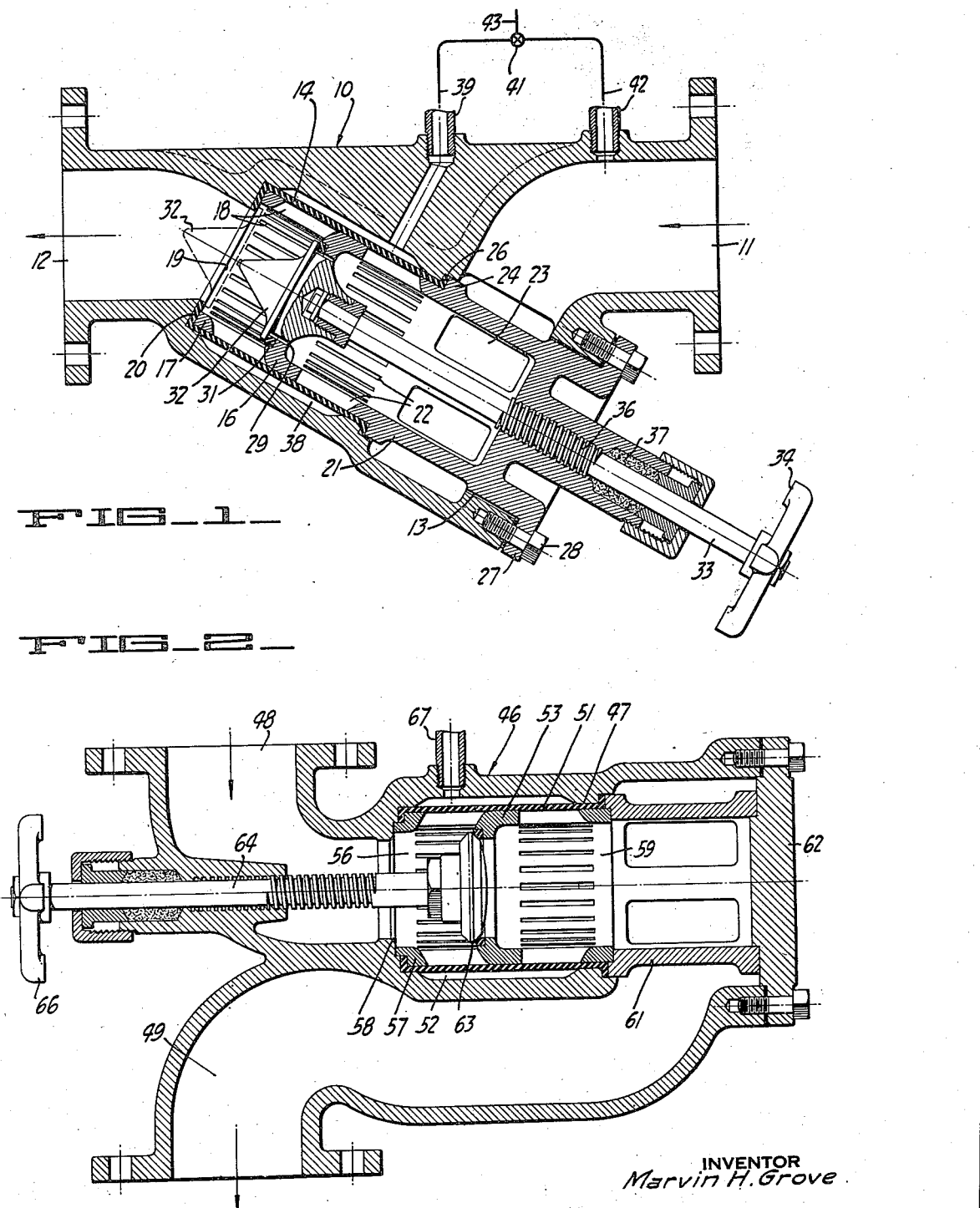

2,310,628

UNITED STATES PATENT OFFICE 2,310,628

FLOW CONTROL VALVE

Marvin H. Grove, Piedmont, Calif.

Application April 15, 1942, Serial No. 438,993

4 Claims. (Cl. 277—46)

This invention relates generally to valves for controlling flow of various fluids, including both gases and liquids. More particularly, it relates to valves of the type making use of a tube or sleeve formed of resilient material, and which is operated by means of a controlling fluid pressure to permit or interrupt flow of fluid through the valve body.

In copending application, Serial No. 429,258 filed February 2, 1942, there is disclosed a fluid control valve making use of a tube or sleeve formed of resilient material like soft vulcanized rubber. The resilient tube has its ends sealed with respect to the valve body about the inlet and outlet passages, and an intermediate portion of the tube is adapted to engage and seal upon the periphery of a circularly contoured barrier. A chamber is formed about the tube for receiving a controlling fluid pressure. By applying fluid pressure to this chamber, the tube closes upon the barrier against inflow pressure, and when the chamber is vented, inflow pressure expands the tube to permit flow about the barrier.

In certain installations such valves may not be properly serviced, and in such event there is a possibility of failure to properly open or close. Such failure may result, for example, from a rupture of the resilient tube, or possibly a freezing of the tube to the periphery of the barrier. In addition, there may be instances when it is desirable to shut off flow of fluid irrespective of any automatic or remote controlling mechanisms, or one may desire to replace the tube or barrier without moving the device as a whole from the line, and without shutting off the inlet side of the valve from the source of fluid pressure to which it is connected.

It is an object of the present invention to provide a valve which will take care of one or more of the contingencies referred to above. When the present invention it is possible to positively shut off flow of fluid through the valve irrespective of the ability of the rubber tube to properly close upon the periphery of the barrier. Also it is possible to permit flow through the valve irrespective of the ability of the rubber tube to relieve itself from the periphery of the barrier as with normal operation. With one form of the invention it is also possible to shut off flow of fluid through the body while one is replacing the resilient tube.

Further objects and features of the invention will appear from the following description in which the preferred embodiments have been set forth in detail, in conjunction with the accompanying drawing.

Referring to the drawing:

Figure 1 is a side elevational view, in cross section, showing a valve incorporating the present invention; and Figure 2 is a side elevational view, in cross section, showing another embodiment of the invention.

As previously stated, the valves illustrated in Figures 1 and 2 incorporate certain features of the valve disclosed and claimed in application Serial No. 429,258, filed February 2, 1942. Referring first to Figure 1, the valve consists of a body 10 provided with the inlet and outlet passages 11 and 12. The body is bored at an angle to the line of centers of passages 11 and 12 to provide a cylindrical bore 13. Within this bore there is a tube 14 formed of suitable resilient material such as soft vulcanized rubber or synthetic rubber. This tube is adapted to engage and seal upon the periphery of a circularly contoured barrier 16.

Extending from the outflow side of the barrier 16 there is a sleeve portion 17 provided with slots 18. The end part 19 of the sleeve forms a ring for engaging and clamping upon an inturned flange 20 which is formed upon the adjacent end of the tube 14. As will be presently explained, this flange also forms a stationary annular valve seat. On the inflow side of the barrier 16 there is a sleeve portion 21 which is provided with slots 22 and ports 23. An annular shoulder 24 formed on this sleeve portion clamps upon an outturned flange 26 which in turn is formed upon the adjacent end of the resilient tube 14. Sleeve 21 extends to the exterior of the bore 13, and its outer end is provided with an attachment flange 27 and forms a closure for the body. Bolts or screws 28 clamp flange 27 to the body.

In place of using a solid barrier as disclosed in copending application Serial No. 429,258, the barrier in this instance is provided with a central port 29. It also has a seat ring 31 surrounding this port and adapted to be engaged by the movable supplemental valve member 32. An operating stem 33 has its inner end attached to valve member 32 and its outer end is provided with a lever or hand wheel 34. A threaded portion 36 of the stem 33 has threaded engagement with the outer end portion of sleeve 21. A packing gland 37 is shown to prevent leakage about the stem 33. Valve member 32 is adapted to seat not only upon the ring 31, but is also engageable with the inner face of flange 20, as illustrated in dotted lines.

In order to control opening and closing of the resilient tube 14 with respect to the barrier 16, the body is formed to provide a closed chamber 38 extending about the tube. Fluid can be introduced or vented from chamber 38 through the pipe 39. While pipe 39 can connect to various sources of controlling fluid, including gas or liquid under pressure, it is convenient in many instances to use pressure from the inlet side. Thus this pipe is shown connected through a three way valve 41 with a pipe 42 which communicates with the inflow passage 11. For one position of valve 41, pipes 39 and 42 are interconnected so that inlet pressure is applied to chamber 38 to retain the tube 14 closed upon the barrier 16. For another position of valve 41, communication between pipes 42 and 39 is interrupted, and pipe 39 is connected to a vent pipe 43, whereby liquid from chamber 38 can be vented to the atmosphere. It is evident that valve 41 can be operated automatically or manually, and it can be placed at a remote point.

Operation of the valve described above can be reviewed as follows: With the valve member 32 closed upon the barrier 16, flow through the valve is controlled by changing the setting of the control valve 41. When this valve is turned so that liquid under pressure from the inlet side is applied to chamber 38, tube 14 remains engaged and sealed upon the barrier. However, when the valve 41 is turned to vent liquid from the chamber 38, the tube is expanded by pressure on the inlet side, and flow can occur about the barrier to the outlet passage 12. In the event one desires to interrupt flow through the valve, due for example to some condition which prevents the proper closure of the tube 14 upon the barrier, as for example the failure of the control valve 41, or rupture of the tube 14, then one can close the valve by turning hand wheel 34 to move the valve member 32 into engagement with the resilient flange 20, as shown in dotted lines. On the other hand, if some condition prevents proper opening of the tube 14 with respect to the barrier, due for example to failure of control valve 14, or possible freezing of the tube 14 upon the barrier, then the valve member 32 can be placed in a position intermediate seat ring 31 and the resilient flange 20, thus permitting the flow to occur through the barrier port 29. Another possibility is that one may desire a throttled flow of fluid through the valve when the control valve 41 is set for closed position. Here again by adjusting the setting of valve 32 a desired regulated flow can be secured, thus extending the field of usefulness for which the valve is adapted.

In the event one desires to repair parts of the valve, the complete assembly comprising the slotted sleeve portions, the barrier 16, and the valve member 32, is removed from the body for repair or replacement.

In the embodiment of Figure 2, the arrangement is such that the resilient tube can be removed from the body for repair or replacement, while the supplemental valve member remains within the body and in closed position. Also in this instance the body is shaped differently to reduce the distance between the inlet and outlet pipe couplings. Thus the body 46 in this instance is provided with a bore 47 extending at right angles to the line of centers of the inlet and outlet passages 48 and 49. The resilient tube 51 is fitted within the bore 47, and is surrounded by the fluid chamber 52. The barrier 53 is likewise ported and provided with the valve seat 54. The slotted sleeve portion 56 on the inlet side of the barrier forms an end shoulder 57 which clamps and seals upon the adjacent portion of the resilient tube. Adjacent this shoulder the body is provided with an annular stationary valve seat 58.

On the outlet side of the barrier the slotted sleeve portion 59 is engaged by the ported sleeve 61, which in turn is held in position by the closure plate 62. A valve member 63 of the globe or disc type is adapted to engage either seat ring 54 or the seat 58, and is carried by the inner end of the threaded operating stem 64. This stem extends through the body and has its outer end provided with hand wheel 66. Pipe 67 is shown for applying controlling fluid to the chamber 52.

The operation of the embodiment shown in Figure 2 is generally the same as Figure 1. However, if one desires to remove the resilient tube 51 for replacement or repair, valve member 63 can be placed in closed position upon the seat 58, and can remain in such position while the resilient tube, together with the barrier 53 and sleeve portions 61 and 62, are being removed for replacement or repair. Thus the valve can remain connected to a line with pressure being continuously applied to the inlet side.

I claim:

1. In a flow control valve, a body having inflow and outflow passages, a resilient tube within the body and having its ends sealed with respect to the body about said passages, the body providing a chamber about the tube for receiving a controlling fluid under pressure, a circularly contoured barrier disposed within the tube, the tube being adapted to engage and seal upon the periphery of the barrier, a port formed through the barrier and when unobstructed serving to permit flow of fluid through the same, and supplemental valve means serving to control flow of fluid through said port.

2. In a flow control valve, a body having inflow and outflow passages, a tube of resilient material within the body and having its ends sealed with respect to the body about the passages, the body providing a chamber about the tube for receiving a controlling fluid under pressure, a circularly contoured barrier disposed within the tube, the tube being adapted to engage and seal upon the periphery of the barrier, the barrier being provided with a port for flow of fluid through the same, a supplemental valve member movable relative to the barrier and adapted to seat upon the barrier to interrupt flow of fluid through the port, and a valve seat carried by the body and adapted to be engaged by said valve member, said valve member when engaged with said last seat serving to interrupt flow of fluid through the body irrespective of the positioning of the resilient tube.

3. In a flow control valve, a body having inflow and outflow passages, a tube of resilient material within the body, the tube having its ends sealed with respect to the body about the passages, a circularly contoured barrier disposed within the tube, the body being formed to provide a closed fluid chamber about the resilient tube and adapted to receive fluid under pressure, and the tube being adapted to engage and seal upon the periphery of the barrier, a fluid port formed through the barrier, an annular valve seat surrounding the port and mounted upon the barrier, an annular valve seat carried by the body adjacent one end of the tube and surrounding one of said passages, a valve member adapted to engage either one of said seats, and means operated from the exterior of said valve for moving said valve member either in contact with the barrier to prevent flow of fluid through said port, or into engagement with the seat mounted upon the body to prevent flow of fluid through the valve irrespective of the position of the resilient tube.

4. In a flow control valve, a body having inflow and outflow passages, a tube of resilient material within the body and having its ends sealed with respect to the body about the passages, the body providing a chamber about the tube for receiving a controlling fluid under pressure, a circularly contoured barrier disposed within the tube intermediate the ends of the same, the tube being adapted to engage and seal upon the periphery of the barrier, sleeve portions extending from both the inflow and outflow sides of the barrier, the barrier being provided with a port for flow of fluid through the same, a valve seat formed on the barrier about the port, another annular valve seat formed on the body adjacent one end of the tube, and a supplemental valve member disposed within the tube and movable longitudinally of the tube between two limiting positions, the valve member in one limiting position engaging and sealing upon the seat formed on the barrier, and in the other limiting position engaging the seat formed on the body.

MARVIN H. GROVE.